United States Patent
Quettier et al.

(10) Patent No.: US 12,325,762 B2
(45) Date of Patent: Jun. 10, 2025

(54) METHOD FOR PREPARING A HEAT-MODIFIED STARCH

(71) Applicant: ROQUETTE FRERES, Lestrem (FR)

(72) Inventors: Claude Quettier, Lambersart (FR); Vincent Wiatz, Premesques (FR); Solène Bock, Lambersart (FR); Jacques Legrand, Verquin (FR)

(73) Assignee: Roquette Freres, Lestrem (FR)

( * ) Notice: Subject to any disclaimer, the term of this patent is extended or adjusted under 35 U.S.C. 154(b) by 802 days.

(21) Appl. No.: 17/594,933

(22) PCT Filed: May 6, 2020

(86) PCT No.: PCT/FR2020/050754
§ 371 (c)(1),
(2) Date: Nov. 3, 2021

(87) PCT Pub. No.: WO2020/225512
PCT Pub. Date: Nov. 12, 2020

(65) Prior Publication Data
US 2022/0213230 A1    Jul. 7, 2022

(30) Foreign Application Priority Data

May 7, 2019  (FR) ..................... 19 04787
Jul. 2, 2019  (FR) ..................... 19 07333

(51) Int. Cl.
| C08B 30/12 | (2006.01) |
| A21D 2/18 | (2006.01) |
| A23G 9/34 | (2006.01) |
| A23L 29/212 | (2016.01) |

(52) U.S. Cl.
CPC .............. *C08B 30/12* (2013.01); *A21D 2/186* (2013.01); *A23G 9/34* (2013.01); *A23L 29/212* (2016.08)

(58) Field of Classification Search
None
See application file for complete search history.

(56) References Cited

U.S. PATENT DOCUMENTS

| 6,221,420 B1 | 4/2001 | Thomas et al. |
| 10,676,540 B2 | 6/2020 | Vezzani |
| 2001/0017133 A1 | 8/2001 | Chiu |
| 2011/0014328 A1 | 1/2011 | Rizvi et al. |
| 2015/0201654 A1* | 7/2015 | Essers ..................... C08B 30/00 536/102 |
| 2015/0239994 A1 | 8/2015 | Santhanam et al. |
| 2016/0053027 A1* | 2/2016 | Essers ..................... C08L 3/02 127/71 |
| 2020/0308311 A1* | 10/2020 | Bock .......................... C08L 3/02 |
| 2023/0279157 A1* | 9/2023 | Bock .......................... C08L 3/02 127/33 |

FOREIGN PATENT DOCUMENTS

| WO | 9603891 A1 | 2/1996 |
| WO | 9926981 A2 | 6/1999 |
| WO | 2014042537 A1 | 3/2014 |
| WO | 2019032011 A1 | 2/2019 |

OTHER PUBLICATIONS

The English translation of the Chinese Office Action, mailed on Aug. 12, 2023, in the corresponding Chinese Appl. No. 202080031881.7.

Zhang Tianxue, "Effect of heat treatment on the structure and properties of highland barley starch," Engineering Technology Edition, China Excellent Master's Theses Full-text Database, [2017] No. 2, pp. B024-B788, Feb. 15, 2017. (English translation only).

The English translation of the International Search Report and Written Opinion, mailed on Oct. 21, 2020, in the corresponding PCT Appl. No. PCT/FR2020/050754.

The English translation of the Chinese Office Action, mailed on Aug. 3, 2022, in the corresponding Chinese Appl. No. 202080031881.7.

* cited by examiner

*Primary Examiner* — John J Figueroa

(57) ABSTRACT

A method for producing a heat-modified starch, comprising the steps of: (i) preparing a starch milk having a solids content of between 20% and 45% by weight and adding an alkaline agent, so as to obtain a final conductivity of between 4 and 7 mS/cm (ii) filtering the starch milk so as to recover a starch cake; (iii) introducing the starch cake, continuously, into a dryer at the same time as a continuous stream of hot air in order to recover a dried powder; (iv) continuously supplying a turboreactor with the dried powder, and by setting parameters for the speed of rotation of the stirrer, so that the dried powder is continuously centrifuged and conveyed into the turboreactor; (v) recovering the heat-modified starch produced.

4 Claims, No Drawings

METHOD FOR PREPARING A HEAT-MODIFIED STARCH

The invention relates to the production of heat-modified starch, which starch has stabilized viscosity following this heat treatment. Such heat-modified starches can then be used as texturizing and thickening agents in numerous food applications, in particular in soups, sauces, in desserts such as yogurts, stirred fermented milks, thermized yogurts, dessert creams, but also beverages, ready meals, and preparations based on meat or fish, such as surimi.

FIELD OF THE INVENTION

Synthesized biochemically, a source of carbohydrates, starch is one of the most widespread organic materials in the plant kingdom, where it constitutes organisms' nutrient reserves.

Starches have always been used in the food industry, not only as a nutritional ingredient but also for their technical properties, as a thickening agent, binder, stabilizer or gelling agent.

For example, native starches are used in preparations requiring cooking. Corn starch, in particular, forms the basis of "powders for flan".

Since it is rich in amylose, it retrogrades and therefore gels strongly. It makes it possible to obtain firm flans after cooking and cooling. It is also suitable for custards.

However, those cannot be used in pastries intended to be frozen since, on defrosting, the phenomenon of syneresis, which is reflected in the expulsion of water, destroys the texture of the custard.

Thus, in its native state, starch has limited applicability due to syneresis, but also due to:
its low resistance to shear stresses and to heat treatments,
its low processability and
its low solubility in common organic solvents.

Thus, in order to meet today's demanding technical requirements, the properties of starch have to be optimized by various methods known as "modification".

These main modifications therefore aim to adapt the starch to the technical constraints resulting from cooking, but also from freezing/thawing, from appertization or sterilization, and to make it compatible with modern food (microwaves, instant meals, "high temperatures", etc.).

Starch modification therefore aims to correct one or more of the abovementioned defects, thereby improving its versatility and meeting the needs of consumers.

Techniques for modifying starch have generally been classified into four categories: physical, chemical, enzymatic and genetic, the ultimate goal being to produce various derivatives with optimized physicochemical properties.

Chemical and physical modifications are most commonly implemented.

Chemical treatment consists of introducing functional groups into the starch, which alters its physicochemical properties in a noteworthy manner. Indeed, such modifications of granular native starches profoundly alter their behavior in terms of gelatinization, bonding and retrogradation.

Generally, these modifications are made by chemical derivatization, such as esterification, etherification, crosslinking or grafting.

However, chemical modifications are less sought-after by consumers in food applications (also for environmental reasons), even if some modifications are considered to be safe.

Various physical modifications are thus proposed, for example:
heat moisture treatment (HMT), consisting of treating the starch at controlled humidity levels (22-27%) and at high temperature, for 16 hours, in order to alter the structure and physicochemical properties of the starch;
annealing, consisting of treating the starch in an excess of water at temperatures below the gelatinization temperature, in order to come close to the glass transition temperature;
high pressure processing (HPP), by means of which the amorphous regions of the starch granule are hydrated, leading to a distortion of the crystalline parts of the granule and promoting the accessibility of said crystalline regions to water;
glow discharge plasma treatment, which generates, at ambient temperature, high-energy electrons and other highly active species. Applied to the starch, these active species excite the chemical groups in the starch and cause significant crosslinking of the macromolecules;
osmotic pressure treatment (OPT), carried out in the presence of solutions with a high content of salts. The starch is suspended in sodium sulfate in order to produce a uniform suspension.

The starch goes from type B to type A after treatment, thereby acquiring a gelatinization temperature which increases significantly;
"thermal inhibition" treatment. Generally, thermal inhibition means dehydrating a starch until it reaches the anhydrous or substantially anhydrous state (i.e. <1% humidity), then a heat treatment at more than 100° C. for a sufficient period of time to "inhibit" the starch, in this case to afford it properties of crosslinked starches. Moreover, it is necessary to place the starch under pH conditions which are at least neutral to preferentially alkaline, before carrying out the step of forced dehydration.

An alternative to "thermal inhibition" treatment has been proposed in the solvent phase and consists of heating a non-pre-gelatinized granular starch in an alcohol-based medium in the presence of a base and salts at a temperature of 120° to 200° C. for 5 minutes to 2 hours.

Regardless, the thermal inhibition process thus leads to obtaining a starch paste having properties of increased resistance to viscosity breakdown, and a non-cohesive texture.

The technical field to which the invention belongs is that of thermal inhibition treatment of starch without an aqueous-alcoholic solvent.

In this particular technical field, mention may more particularly be made of U.S. Pat. No. 6,221,420, which describes a thermally inhibited starch obtained by dehydration then heat treatment.

The main steps are:
dehydration of the starch to a water content of less than 1%, carried out at a temperature of between 100 and 125° C., then
heat treatment of the dry starch thus obtained, at approximately 140° C., in a reactive fluidized bed, for a duration of the order of 20 hours.

Preferentially, before the step of dehydrating the starch, it is recommended to perform a step of alkalinization of the starch, making it possible to bring the pH of the starch suspension to a value of between 7 and 10, preferably of between 8 and 10.

At this stage, before the step of dehydration proper which precedes the inhibition step, the water content of the starch (as demonstrated by way of examples) is then between 8 and 10%.

US 2001/0017133 describes a similar method, wherein the starch is also dehydrated below 125° C. before the inhibition process is begun (at a temperature of more than 100° C., preferentially of between 120 and 180° C., more preferentially of between 140 and 160° C.) for a duration of up to 20 hours, preferentially of between 3 hours 30 and 4 hours 30.

Before the dehydration step, the conventional alkalinization step leads to a starch suspension having a pH value of between 7.5 and 11.2, preferably of between 8 and 9.5%, and a water content of between 2 and 15%.

A variant was proposed in patent application WO 2014/042537, which variant relates to heating an alkaline starch at temperatures of between 140 and 190° C. while ensuring that the inhibition method is initiated and carried out in the presence of a sufficient amount of water, that is more than 1% water.

In other words, this method recommends the thermal inhibition of a starch which has been alkalinized beforehand without carrying out a dehydration step.

The starch preparation or the starch is thus brought to a pH of between 9.1 and 11.2, preferentially to a value of the order of 10, and the humidity is adjusted to between 2 and 22%, preferentially between 5 and 10%.

The thermal inhibition is subsequently carried out directly on this powder or this starch, at a temperature of between 140 and 190° C., preferentially between 140 and 180° C., for a duration of 30 minutes.

From the foregoing, it is noted that the methods for thermal inhibition implemented in order to stabilize the viscosity of starches employ methods requiring:
- long treatment durations, i.e. up to 20 hours, and
- controlling the water content of the starches to be treated, based on the methods proposed in the prior art, whether to values of less than 1% or alternatively of between 2 and 22%.

There is therefore a need for a novel method for inhibiting starch, making it possible to further reduce the reaction time and without it being necessary to control the water content of the starch to be "thermally inhibited".

DESCRIPTION OF THE INVENTION

Thus, the invention relates to a method for producing a heat-modified starch, from a starch milk, comprising the steps consisting in:
(i) preparing a starch milk with solids of between 20 and 45% by weight, preferably between 30 and 40% by weight, and adding an alkaline agent at a weight concentration of between 25 and 35% by weight, so as to obtain a final conductivity of between 4 and 7 mS/cm;
(ii) filtering said starch milk so as to recover a starch cake having a moisture content of between 30 and 45% by weight and so that the conductivity of the filtered and resuspended starch at 20% by weight of solids is between 0.7 and 2.5 mS/cm;
(iii) introducing said starch cake continuously into a dryer together with a continuous flow of hot air having a temperature of between 130° C. and 185° C. to recover a dried powder having a moisture content of between 8% and 18% by weight;
(iv) continuously supplying a turboreactor with the dried powder, the internal wall of the turboreactor being maintained at a temperature of between 180° C. and 240° C., and by setting the rotational speed of the turboreactor stirrer to achieve a centrifugal acceleration of between 850 and 2100 m·s$^{-2}$, so that said dried powder is continuously centrifuged and conveyed into said turboreactor for a total time of between 3 and 45 minutes;
(v) recovering the heat-modified starch thus produced.

The starch to be used in the method of the invention may be of any origin, for example corn, waxy corn, amylomaize, wheat, waxy wheat, leguminous plants such as pea and faba bean, potato, waxy potato, cassava, tapioca, waxy tapioca, rice, konjac, etc.

Preferentially, corn starch will be chosen, more particularly waxy corn starch (with a high amylopectin content), potato starch, cassava, pea and faba bean, as will be demonstrated by way of examples below.

The alkaline agent is preferentially selected from the group consisting of sodium hydroxide, sodium carbonate, tetrasodium pyrophosphate, ammonium orthophosphate, disodium orthophosphate, trisodium phosphate, calcium carbonate, calcium hydroxide, potassium carbonate, and potassium hydroxide, taken alone or in combination, even more preferentially sodium carbonate.

The method according to the invention requires first preparing a starch milk with solids of between 20 and 45% by weight, preferably between 30 and 40% by weight, and adding an alkaline agent at a weight concentration of between 25 and 35% by weight, so as to obtain a final conductivity of between 4 and 7 mS/cm.

The next step then consists in controlling the alkaline impregnation of the starch by adding the alkaline agent in the form of a solution at a weight concentration of between 25 and 35%, preferably of 30%, in order to obtain a conductivity, on the milk, of between 4 and 7 mS/cm.

Indeed, the Applicant company has found that:
- the addition of the alkaline agent, more particularly the sodium carbonate, directly on the starch in the milk phase makes it possible to more effectively reach the sought-after high pH values (that is between 10.2 and 10.8, preferably between 10.5 and 10.65) than spraying the starch in the dry phase with sodium carbonate, in the sense that the addition in the milk phase enables better migration of the carbonate within the starch granules compared to powder impregnation.

Moreover, since impregnation in the powder phase requires adjusting the moisture content of the starch to high values, part of the energy intended for treating the product will therefore be lost to ensure the evaporation of the residual water.
- the addition of the alkaline agent in solution from a solution containing a weight concentration of between 25 and 35%, preferably of 30%, enables total dissolution of the alkaline agent in the starch milk, a quicker and more precise pH adjustment, and makes it possible to prevent deposition of solid alkaline agent at the bottom of the dryer in the event of it not dissolving.
- controlling the level of impregnation of the starch via conductivity measurements makes it possible to achieve the required precision for said high pH values.

The following step entails filtering said starch milk so as to recover a starch cake having a moisture content of between 30 and 45% by weight and so that the conductivity of the filtered and resuspended starch at 20% by weight of solids is between 0.7 and 2.5 mS/cm.

After this alkalinization step, the starch is dried to reduce its moisture content.

The following step therefore consists of introducing said starch cake obtained in the previous step continuously into a dryer together with a continuous flow of hot air having a temperature of between 130° C. and 185° C. to recover a dried powder having a moisture content of between 8% and 18% by weight.

This step can be carried out in a flash dryer, well known to the skilled person.

Said dried powder is then continuously fed into a turboreactor the inner wall of which is maintained at a temperature of between 180° C. and 240° C., by setting the rotational speed of the stirrer so as to achieve a centrifugal acceleration of between 850 and 2100 m·s$^{-2}$, in such a way that the said dried powder is continuously centrifuged and fed into said turboreactor for a total period of between 3 and 45 minutes.

In this step of implementation of the method of the invention, the setting of the rotational speed of the stirrer is determined by calculation, with regard to the centrifugal acceleration to be achieved, that is comprised according to the invention between 850 and 2100 m·s$^{-2}$.

The calculation is as follows, considering that a turboreactor is composed of a stirrer shaft with blades having a certain orientation defined by the manufacturer (in this case, we can consider the device marketed by the company VOMM under the brand name ES350):

The centrifugal velocity is defined as the linear velocity at the blade tip "v" squared, divided by the radius R (distance between the stirrer shaft and the blade tip) and therefore expressed in m·s$^{-2}$.

$$\vec{a} = v^2/R \quad \text{[Math. 1]}$$

The linear speed at the blade tip is defined by the constant π multiplied by the diameter and the rotational speed of the stirrer shaft in rpm all divided by 60.

$$v = \frac{\pi \times D \times \text{Rotational speed}}{60} \quad \text{[Math. 2]}$$

As illustrated below, for a VOMM ES350 turboshaft dryer, the linear velocity at the blade tip can be easily calculated from the values given by the manufacturer:
diameter: 0.35 m;
rotational speed of the stirrer shaft: 1000 rpm.

The mechanical action thus exerted by the rotor of the turboreactor provides a high quantity of kinetic energy, which encourages the intra- and intermolecular reactions between the polyglucosylated chains of the starch, thus leading to a higher degree of branching than the starting starch, placing it in a more "cross-linked" state.

Moreover, the formation of a thin, dynamic layer of starch circulating inside the turboreactor allows for a shortened reaction time, between 3 and 40 minutes, which is less than the treatments of the prior art, and particularly suitable for a continuous industrial application.

According to a preferred way, the heating jacket of the turboreactor is generally intended to be traversed by a heating fluid, such as a diathermic oil or steam.

By means of the double heating jacket of the turboreactor, it is possible to ensure precise temperature control inside the turboreactor, so that the thin, dynamic starch layer is kept in the optimal temperature range for the intimate mixing step, encouraging its physical transformation.

The last step consists in recovering the heat-modified starch thus obtained.

The invention further relates to heat-modified starches capable of being obtained according to the above method of the invention.

The heat-modified starches according to the invention will advantageously be used, based on their respective properties, as a thickening agent or texturizing agent in food applications, in particular in soups, sauces, beverages and ready meals, and in desserts such as yogurts and stirred fermented milks, and thermized yogurts.

Due to their texturizing and gelifying properties, they also have numerous applications in widely varying fields such as:
acidic soups and sauces (pasteurized and sterilized),
pasta sauces containing meat juices,
desserts such as yogurts, stirred fermented milks, thermized yogurts, dessert creams,
mayonnaise and hot vinaigrette,
pie filling, fruit or meat filling or stable meat filling, either sweet or savory, dinners (short-life ready meals),
pudding (dry mix to be cooked),
baby food/preparations for infants,
beverages,
ready meals, preparations based on meat or fish, such as surimi.
animal feed The invention will be better understood with the aid of the following examples, which are intended to be illustrative and non-limiting.

Materials and Methods

Measurement of Conductivity

The method implemented here is adapted from the European Pharmacopoeia—current official edition—Conductivity (§ 2.2.38).

Materials:
KNICK 703 electronic conductivity meter, also equipped with its measuring cell and verified according to the procedure described in its instruction manual.

Procedure:
A solution containing 20 g of sample in powder form and 80 g of distilled water having a resistivity of greater than 500,000 ohms·cm is prepared.

The measurement is carried out at 20° C. using the conductivity meter, referring to the procedure indicated in the instrument's user manual.

The values are expressed in microSiemens/cm (µS/cm) or milliSiemens/cm (mS/cm).

Measuring the Viscosity of a Starch Suspension Using the Rapid Viscometer Analyzer (RVA)

This measurement is carried out at acid pH (between 2.5 and 3.5) under determined concentration conditions and according to a suitable temperature/time analysis profile.

Two Buffer Solutions are Prepared:

Buffer A

The following are added to a 1 liter beaker containing 500 mL of demineralized water:
91.0 g of citric acid monohydrate (purity >99.5%), and homogenization is carried out,
33.0 g of sodium chloride (purity >99.5%), and homogenization is carried out until complete dissolution,
300.0 g of 1 N sodium hydroxide.

The contents are decanted into a 1 L volumetric flask and demineralized water is added to reach 1 L.

Buffer B 100 g of buffer A are mixed with 334.0 g of demineralized water.

The product to be analyzed is prepared in the following manner:

A mass of 1.37 g of the dry product to be analyzed, obtained in this way, is directly introduced into the receptacle of the viscometer, and buffer solution B is introduced until a mass equal to 28.00±0.01 g is obtained. Homogenization is carried out using the stirrer blade of the Rapid Visco Analyzer (RVA-NewPort Scientific).

The time/temperature and speed analysis profile in the RVA is then carried out as follows:

TABLE 1

| Time hh:mm:ss | Temperature °C. | Rotational speed Revolutions/min (RPM) |
|---|---|---|
| 00:00:00 | 50 | 100 |
| 00:00:10 | 50 | 500 |
| 00:00:20 | 50 | 960 |
| 00:00:30 | 50 | 160 |
| 00:01:00 | 50 | 160 |
| 00:05:00 | 92 | 160 |
| 00:17:00 | 92 | 160 |
| 00:20:00 | 50 | 160 |

End of test: 00:20:05 (hh:mm:ss)
Initial temperature: 50° C.±0.5° C.
Data acquisition interval: 2 seconds
Sensitivity: low The results of the measurements are given in RVU (unit used to express the viscosity obtained on the RVA), it being known that 1 RVU unit=12 cPoises (cP).
As a reminder, 1 cP=1 mPa·s.
The results will therefore be presented in mPa·s.
The measurements will be of the viscosity taken "at the peak", i.e. the maximum viscosity value between 4 and 6 minutes, and "at the drop", i.e. the difference between the viscosity value at the peak and that measured at 17 minutes.

EXAMPLES

Example 1: Preparation of Heat-Modified Starches "A" from Potato Starch i) The alkalinization of the potato starch is carried out according to the following steps:
Prepare a potato starch suspension at 36.5% by weight of solids (S)
Prepare a solution of sodium carbonate at 30% weight concentration and heat to 40-50° C. to promote the dissolution of the carbonate
Add the solution of sodium carbonate so as to obtain a conductivity on the milk of between 4 and 6 mS/cm;
Ensure a contact time of 0.5 h;
ii) Filter through a horizontal wringer with a scraper blade to separate the water and starch so that the final conductivity on the resuspended starch at 20% solids weight is between 0.7 and 1.1 mS
iii) Dry the starch to a moisture content of 12% by weight in a flash dryer where the air flow is at a temperature of 150° C.
iv) Heat treatment
The product thus obtained is heat-treated in continuous VOMM turboreactors in series type ES350, whose centrifugal acceleration is set at 1700 m·s$^{-2}$, whose setpoint temperature is fixed at 210° C. and whose air flow rate is fixed at 300 Nm$^3$h.

The continuous turboreactors of VOMM type ES350 in series are configured to subject the product to a total residence time between 30 and 45 min, such that the temperature difference between the setpoint and the temperature of the product at the outlet of the reactor, referred to as Delta T, is a value of the order of 20-22° C.

The process parameters are given in the following table.

TABLE 2

| Exp | Conductivity on product after impregnation, resuspended at 20% by weight of S, in mS/cm | Moisture content of the product before heat treatment in % by weight | Delta T | Setpoint T° C. | Residence time (min) |
|---|---|---|---|---|---|
| Potato starch base | 0.11 | 15.7 | 0 | 0 | 0 |
| A-1 | 0.96 | 12 | 21 | 210 | 30 |
| A-2 | 0.96 | 12 | 21 | 210 | 40 |
| A-3 | 0.96 | 12 | 22.5 | 210 | 45 |

The RVA viscosity measurements are carried out and presented in the table below.

Results

TABLE 3

| Tests | Drop RVA (mPa · s) | Peak RVA (mPa · s) |
|---|---|---|
| Potato starch base | 554 | 877 |
| A-1 | −226 | 654 |
| A-2 | −382 | 451 |
| A-3 | −427 | 305 |

The heat-modified starches A-1, A-2 and A-3 obtained from potato starch have an improved stability compared to the native starch: less viscosity gain and retrogradation are observed when using these inhibited starches. This can be seen by measuring the fall with the RVA viscometer: the more negative the fall, the more resistant the inhibited starch will be to shearing, to the acidity of the media and to heat treatments.

Example 2: Preparation of Heat-Modified Starches "B" from Cassava Starch i) The alkalinization of the cassava starch is carried out according to the following steps:
Prepare a cassava starch suspension at 36.5% by weight of solids (S)
Prepare a solution of sodium carbonate at 30% weight concentration and heat to 40-50° C. to promote the dissolution of the carbonate;
Add the solution of sodium carbonate so as to obtain a conductivity on the milk of between 4 and 6 mS/cm;
Ensure a contact time of 0.5 h;
ii) Filter through a horizontal wringer with a scraper blade to separate the water and starch so that the final conductivity on the resuspended starch at 20% solids weight is between 0.7 and 1.1 mS.

iii) Dry the starch to a moisture content of 10% in a flash dryer where the air flow is at a temperature of 150° C.

iv) Heat treatment

The product thus obtained is heat-treated in continuous VOMM type ES350 turboreactors in series, whose centrifugal acceleration is set at 1700 m·s$^{-2}$, whose setpoint temperature is fixed at 210° C. and whose air flow rate is fixed at 300 Nm$^3$h. The VOMM continuous turboreactors in series are configured to subject the product to a residence time between 17 and 32 min, such that the temperature difference between the setpoint and the temperature of the product at the outlet of the reactor, referred to as Delta T, is a value of the order of 22-27° C.

The process parameters are given in the following table.

TABLE 4

| Exp | Conductivity on product after impregnation, resuspended at 20% by weight of S, in mS/cm | Moisture content of the product before heat treatment, in % by weight | Delta T | Setpoint T° C. | Residence time (min) |
|---|---|---|---|---|---|
| Cassava starch base | 0.10 | 12.5 | 0 | 0 | 0 |
| B-1 | 0.95 | 10 | 27 | 210 | 17 |
| B-2 | 0.95 | 10 | 24 | 210 | 27 |
| B-3 | 0.95 | 10 | 25 | 210 | 32 |

The RVA viscosity measurements are carried out and presented in the table below.

Results

TABLE 5

| Tests | Drop RVA (mPa · s) | Peak RVA (mPa · s) |
|---|---|---|
| Cassava starch base | 480 | 603 |
| B-1 | 60 | 438 |
| B-2 | −97 | 269 |
| B-3 | −155 | 147 |

The heat-modified starches B-1, B-2 and B-3 obtained from cassava starch have an improved stability compared to the native starch: less viscosity gain and retrogradation are observed when using these inhibited starches.

Example 3: Preparation of Heat-Modified Starches "B" from Pea Starch i) The alkalinization of the pea starch is carried out according to the following steps:
Prepare a pea starch suspension at 33% by weight of solids (S)
Prepare a solution of sodium carbonate at 30% weight concentration and heat to 40-50° C. to promote the dissolution of the carbonate;
Add the solution of sodium carbonate so as to obtain a conductivity on the milk of between 4 and 6 mS/cm;
Ensure a contact time of 0.5 h;
ii) Filter through a horizontal wringer with a scraper blade to separate the water and the starch so that the final conductivity on the resuspended starch at 20% solids weight is between 0.7 and 1.1 mS.

iii) Dry the starch to a moisture content of 10% by weight in a flash dryer where the air flow is at a temperature of 135° C.

iii) Heat treatment

The product thus obtained is heat-treated in continuous VOMM type ES350 turboreactors in series, whose centrifugal acceleration is set at 1700 m·s$^{-2}$, whose setpoint temperature is fixed at 210° C. and whose air flow rate is fixed at 300 Nm$^3$h. The VOMM continuous turboreactors in series are configured to subject the product to a residence time between 6 and 21 min, and such that the temperature difference between the setpoint and the temperature of the product at the outlet of the reactor, referred to as Delta T, is a value of the order of 23-24° C.

The process parameters are given in the following table.

TABLE 6

| Exp | Conductivity on product after impregnation, resuspended at 20% by weight of S, in mS/cm | Moisture content of the product before heat treatment, in % by weight | Delta T | Setpoint T° C. | Residence time (min) |
|---|---|---|---|---|---|
| Pea starch base | 0.09 | 12.9 | 0 | 0 | 0 |
| C-1 | 0.9 | 10 | 24 | 210 | 6 |
| C-2 | 0.9 | 10 | 24 | 210 | 15 |
| C-3 | 0.9 | 10 | 23.5 | 210 | 21 |

The RVA viscosity measurements are carried out and presented in the table below.

Results

TABLE 7

| Tests | Drop RVA (mPa · s) | Peak RVA (mPa · s) |
|---|---|---|
| Pea starch base | 76 | 285 |
| C-1 | −54 | 302 |
| C-2 | −140 | 97 |
| C-3 | −132 | 60 |

The heat-modified starches C1, C-2, and C-3 have improved stability during the process of use compared to native starch: less viscosity gain and retrogradation are observed when using these inhibited starches.

Example 4: Preparation of Heat-Modified Starches "D" from Waxy Corn Starch i) The alkalinization of waxy corn starch is carried out according to the following steps:
Prepare a waxy corn starch suspension at 36.5% by weight of solids (S)
Prepare a solution of sodium carbonate at 30% weight concentration and heat to 40-50° C. to promote the dissolution of the carbonate;
Add the solution of sodium carbonate at 30% weight concentration so as to obtain a conductivity between 4 and 7 mS/cm for the milk;
Ensure a contact time of 0.5 h
ii) Filter through a horizontal wringer with a scraper blade to separate the water and starch so that the final conductivity on the resuspended powder at 20% solids weight is between 1.75 and 2 mS.
iii) Dry the starch to a moisture content of 11.8% in a flash dryer where the air flow is at a temperature of 135° C.
iii) Heat treatment.

The product thus obtained is heat-treated in continuous VOMM type ES350 turboreactors in series, whose centrifugal acceleration is set at 1700 m·s$^{-2}$, whose setpoint temperature is fixed at 200° C. and whose air flow rate is fixed at 300 Nm$^3$h. The VOMM continuous turboreactors in series are configured to subject the product to a residence time between 15 and 35 min, such that the temperature difference between the setpoint and the temperature of the product at the outlet of the dryer, referred to as Delta T, is a value of the order of 17 to 20° C.

The process parameters are given in the following table.

TABLE 8

| Exp | Conductivity on product after impregnation, brought to 20% by weight of S, in mS/cm | Moisture content of the product before heat treatment, in % by weight | Delta T | Setpoint T° C. | Residence time (min) |
| --- | --- | --- | --- | --- | --- |
| Waxy corn starch base | 0.04 | 11.5 | 0 | 0 | 0 |
| D-1 | 1.9 | 11.8 | 20 | 200 | 15 |
| D-2 | 1.9 | 11.8 | 18 | 200 | 25 |
| D-3 | 1.9 | 11.8 | 17 | 200 | 35 |

The RVA viscosity measurements are carried out and presented in the table below.
Results

TABLE 9

| Exp | Drop RVA (mPa · s) | Peak RVA (mPa · s) |
| --- | --- | --- |
| Waxy corn starch base | 914 | 1020 |
| D-1 | −66 | 441 |
| D-2 | −127 | 284 |
| D-3 | −176 | 157 |

The heat-modified starches D1, D-2, and D-3 have improved stability during the process of use compared to native starch: less viscosity gain and retrogradation are observed when using these inhibited starches.

Example 5: Preparation of Heat-Modified Starches "E" from Faba Bean Starch i) The alkalinization of the faba bean starch is carried out according to the following steps:—Prepare a faba bean starch suspension at 33% by weight of solids (S);
Prepare a solution of sodium carbonate at 30% weight concentration and heat to 40-50° C. to promote the dissolution of the carbonate;
Add the solution of sodium carbonate so as to obtain a conductivity on the milk of between 4 and 6 mS/cm;
Ensure a contact time of 0.5 h;
ii) Filter for example through a horizontal wringer with a scraper blade to separate the water and starch and so that the final conductivity on the resuspended starch at 20% solids weight is between 1.5 and 2 mS;
iii) Dry the starch to a moisture content of 14% by weight in a flash dryer where the air flow is at a temperature of 135° C.;
iii) Heat treatment The product thus obtained is heat-treated in continuous VOMM turboreactors in series, whose centrifugal force is set at 1700 m·s$^{-2}$, whose setpoint temperature is fixed at 210° C. and whose air flow rate is fixed at 300 Nm$^3$h.

The VOMM continuous turboreactors in series are configured to subject the product to a residence time between 13 and 25 min, and such that the temperature difference between the setpoint and the temperature of the product at the outlet of the reactor, referred to as Delta T, is a value of the order of 23-24° C.

The process parameters are given in the following table.

TABLE 10

| Exp | Conductivity on product after impregnation, resuspended at 20% by weight of S, in mS/cm | Moisture content of the product before heat treatment, in % | Delta T | Setpoint T° C. | Residence time (min) |
| --- | --- | --- | --- | --- | --- |
| Faba bean starch base | 0.133 | 8 | 0 | 0 | 0 |
| E-1 | 1.9 | 14 | 24 | 210 | 13 |
| E-2 | 1.9 | 14 | 23.5 | 210 | 25 |

The RVA viscosity measurements are carried out and presented in the table below.
Results

TABLE 11

| Tests | Drop RVA (mPa · s) | Peak RVA (mPa · s) |
| --- | --- | --- |
| Faba bean starch base | 82 | 323 |
| E-1 | −79 | 229 |
| E-2 | −47 | 45 |

The heat-modified starches E-1 and E-2 have improved stability during the process of use compared to the native starch: less viscosity gain and retrogradation are observed when using these inhibited starches.

The invention claimed is:

1. A method for producing a heat-modified starch resistant to acid and heat treatments, wherein said process is conducted without use of an aqueous-alcoholic solvent, and comprising the steps of:
(i) preparing a starch milk with solids of between 20 and 45% by weight, preferably between 30 and 40% by weight, and adding an alkaline agent at a weight concentration of between 25 and 35%, so as to obtain a final conductivity of between 4 and 7 mS/cm;
(ii) filtering said starch milk so as to recover a starch cake having a moisture content of between 30 and 45% by weight and so that the conductivity of the filtered and resuspended starch at 20% by weight of solids is between 0.7 and 2.5 mS/cm;
(iii) introducing said starch cake continuously into a dryer together with a continuous flow of hot air having a temperature of between 130° C. and 185° C. to recover a dried powder having a moisture content of between 8% and 18% by weight;

(iv) continuously feeding the dried powder into a turboreactor, the inner wall of the turboreactor being maintained at a temperature of between 180° C. and 240° C., and by setting the rotational speed of the stirrer to achieve a centrifugal acceleration of between 850 and 2100 m·s$^{-2}$, so that said dried powder is continuously centrifuged and fed into said turboreactor for a total time of between 3 and 45 minutes;

(v) recovering the heat-modified starch thus produced.

2. The method according to claim 1, wherein the origin of the starch is selected from the group consisting of corn, waxy corn, potato, cassava, pea, and faba bean.

3. The method according to claim 1, wherein the alkaline agent is preferentially selected from the group consisting of sodium hydroxide, sodium carbonate, tetrasodium pyrophosphate, ammonium orthophosphate, disodium orthophosphate, trisodium phosphate, calcium carbonate, calcium hydroxide, potassium carbonate, and potassium hydroxide, taken alone or in combination, and even more preferentially sodium carbonate.

4. A heat-modified starch obtained by the method according to claim 1.

* * * * *